US012780998B2

(12) United States Patent
Lai et al.

(10) Patent No.: US 12,780,998 B2
(45) Date of Patent: Nov. 3, 2026

(54) METHOD FOR MANUFACTURING THERMOPLASTIC VULCANIZATES

(71) Applicant: NANTEX INDUSTRY CO., LTD., Kaohsiung City (TW)

(72) Inventors: Ching-Yuan Lai, Kaohsiung City (TW); Pen-Hsin Chou, Kaohsiung City (TW)

(73) Assignee: NANTEX INDUSTRY CO., LTD., Kaohsiung City (TW)

( * ) Notice: Subject to any disclaimer, the term of this patent is extended or adjusted under 35 U.S.C. 154(b) by 560 days.

(21) Appl. No.: 18/458,541

(22) Filed: Aug. 30, 2023

(65) Prior Publication Data

US 2024/0409700 A1 Dec. 12, 2024

(30) Foreign Application Priority Data

Jun. 12, 2023 (TW) ................................. 112121816

(51) Int. Cl.

| | |
|---|---|
| ***C08J 3/24*** | (2006.01) |
| ***C03C 4/00*** | (2006.01) |
| ***C08C 4/00*** | (2006.01) |
| ***C08J 3/22*** | (2006.01) |

(52) U.S. Cl.

CPC ..................................... *C08J 3/24* (2013.01); *C08C 4/00* (2013.01); *C08J 3/226* (2013.01); *C08J 2323/16* (2013.01); *C08J 2423/12* (2013.01); *C08J 2461/06* (2013.01)

(58) Field of Classification Search

None

See application file for complete search history.

(56) References Cited

U.S. PATENT DOCUMENTS

| | | | | |
|---|---|---|---|---|
| 2022/0195170 | A1* | 6/2022 | Abraham | C08L 33/08 |
| 2022/0195184 | A1* | 6/2022 | Abraham | C08L 67/03 |

* cited by examiner

*Primary Examiner* — Sheeba Ahmed

(74) *Attorney, Agent, or Firm* — MUNCY, GEISSLER, OLDS & LOWE, P.C.

(57) ABSTRACT

A method for manufacturing thermoplastic vulcanizates includes the steps of: subjecting rubber granules, thermoplastic pellets, a filler powder, a cross-linking auxiliary agent powder, a vulcanization accelerator powder, a vulcanizing agent powder, and an auxiliary agent powder to evenly mixing so as to obtain a first mixture; introducing the first mixture into an extruder; introducing, in whole or divided into two portions, a processing oil into the extruder to be evenly mixed with the first mixture so as to obtain a second mixture, the processing oil being present in an amount ranging from 130 parts by weight to 200 parts by weight based on 100 parts by weight of the rubber granules; and subjecting the second mixture to dynamic vulcanization in the extruder so as to obtain the thermoplastic vulcanizates.

20 Claims, No Drawings

METHOD FOR MANUFACTURING THERMOPLASTIC VULCANIZATES

CROSS-REFERENCE TO RELATED APPLICATION

This application claims priority to Taiwanese Invention Patent Application No. 112121816, filed on Jun. 12, 2023.

FIELD

The present disclosure relates to a method for manufacturing vulcanizates, and more particularly to a method for manufacturing thermoplastic vulcanizates.

BACKGROUND

Dynamic vulcanization is a chemical process in which a (unvulcanized) rubber and (non-vulcanized) thermoplastics are subjected to melt-blending in the presence of a vulcanizing agent, so as to vulcanize the rubber. In other words, thermoplastic vulcanizates having a certain degree of softness can be obtained by subjecting the rubber and the thermoplastics to dynamic vulcanization. In industrial practice, after the rubber and the thermoplastics are introduced into an extruder to form a mixture and before addition of the vulcanizing agent, a processing oil is usually added to the mixture, so as to adjust the physical properties of the thus obtained thermoplastic vulcanizates. However, in the actual production process of thermoplastic vulcanizates, when an amount of the processing oil is large, addition of such processing oil all at once would result in the thus obtained thermoplastic vulcanizates not having a degree of softness that is desirable because the rubber, the thermoplastics, and the processing oil are not evenly mixed.

In order to solve the problem of uneven mixing of the rubber, the thermoplastics and the processing oil, in industrial practice, the processing oil is usually divided into at least three portions which are then fed into different barrels of an extruder, as disclosed in Chinese Invention Patent Application Publication No. CN 107429019 A. The more portions the processing oil is divided into, not only the feeding process and the mixing process are relatively increased, but also the required number of barrels for the feeding process is relatively increased, causing a substantial increase in the footprint of the extruder including the required number of barrels, and an overall increase in the equipment required for evenly mixing of the processing oil and other ingredients, thereby resulting in a high production cost of the thermoplastic vulcanizates.

SUMMARY

Therefore, an object of the present disclosure is to provide a method for manufacturing thermoplastic vulcanizates that can alleviate at least one of the drawbacks of the prior art.

According to the present disclosure, the method includes the steps of:

(a) subjecting rubber granules, thermoplastic pellets, a filler powder, a cross-linking auxiliary agent powder, a vulcanization accelerator powder, a vulcanizing agent powder, and an auxiliary agent powder to evenly mixing so as to obtain a first mixture;

(b) introducing the first mixture into an extruder;

(c) introducing, in whole or divided into two portions, a processing oil into the extruder to be evenly mixed with the first mixture so as to obtain a second mixture, the processing oil being present in an amount ranging from 130 parts by weight to 200 parts by weight based on 100 parts by weight of the rubber granules; and (d) subjecting the second mixture to dynamic vulcanization in the extruder so as to obtain the thermoplastic vulcanizates.

DETAILED DESCRIPTION

Before the present disclosure is described in greater detail, it should be noted that if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present invention provides method for manufacturing thermoplastic vulcanizates which includes the following steps (a) to (d).

In step (a), rubber granules, thermoplastic pellets, a filler powder, a cross-linking auxiliary agent powder, a vulcanization accelerator powder, a vulcanizing agent powder, and an auxiliary agent powder were subjected to evenly mixing so as to obtain a first mixture, which was present in a solid form.

In step (b), the first mixture is introduced into an extruder.

In step (c), the processing oil is introduced, in whole or divided into two portions, into the extruder to be evenly mixed with the first mixture, so as to obtain a second mixture. The processing oil is present in an amount ranging from 130 parts by weight to 200 parts by weight based on 100 parts by weight of the rubber granules.

In step (d), the second mixture is subjected to dynamic vulcanization in the extruder so as to obtain the thermoplastic vulcanizates which includes vulcanized rubber present in the dispersed phase and thermoplastics present in the continuous phase.

According to the present disclosure, in step (a), the type of the rubber granules is not particularly limited, as long as the rubber granules can be subjected to dynamic vulcanization. An example of unvulcanized rubber that is common or well-known includes ethylene propylene diene monomer (EPDM) rubber granules, but is not limited thereto. In certain embodiments, the rubber granules are EPDM rubber granules. The amount of the rubber granules may be flexibly adjusted by those skilled in the art according to the performance requirement of the thermoplastic vulcanizates. In certain embodiments, the rubber granules are present in an amount ranging from 18.5 wt % to 35.7 wt % based on 100 wt % of the second mixture.

According to the present disclosure, the type of the thermoplastic pellets is not particularly limited, as long as the thermoplastic pellets can impart thermoplasticity property to the thus obtained thermoplastic vulcanizates. An example of the thermoplastics well-known or commonly used in dynamic vulcanization includes polypropylene, but is not limited thereto. In certain embodiments, the thermoplastic pellets are polypropylene pellets. The amount of the thermoplastic pellets may be flexibly adjusted by those skilled in the art according to the performance requirement of the thermoplastic vulcanizates. In order to allow the rubber granules to be easily mixed with the thermoplastic pellets in the extruder, in certain embodiments, the thermoplastic pellets is present in an amount of not lower than 15 parts by weight based on 100 parts by weight of the rubber granules. In certain embodiments, the thermoplastic pellets is present in an amount ranging from 15 parts by weight to 600 parts by weight based on 100 parts by weight of the rubber granules. During the process of manufacturing the thermoplastic vulcanizates, in order to not only allow the rubber granules and the thermoplastic pellets to be smoothly introduced into the extruder, but also to allow the rubber granules and the thermoplastic pellets to be evenly mixed, in certain embodiments, a particle size ratio of the rubber granules to the thermoplastic pellets is not greater than 3:1.

According to the present disclosure, the type and amount of the filler powder may be flexibly adjusted by those skilled in the art according to the performance requirement of the thermoplastic vulcanizates. An example of the filler powder well-known or commonly used for processing rubber includes kaolin, but is not limited thereto. In certain embodiments, the filler powder is a calcined kaolin powder. In order to allow the first mixture to be evenly mixed with the processing oil, in certain embodiments, the filler powder is present in an amount ranging from 9.5 parts by weight to 50 parts by weight based on 100 parts by weight of the rubber granules.

According to the present disclosure, the type and amount of the cross-linking auxiliary agent powder may be flexibly adjusted by those skilled in the art according to the performance requirement of the thermoplastic vulcanizates. Examples of the cross-linking auxiliary agent well-known or commonly used in vulcanization of rubber include zinc oxide and zinc stearate, but is not limited thereto. In certain embodiments, the cross-linking auxiliary agent powder includes a zinc oxide powder and a zinc stearate powder. In certain embodiments, the cross-linking auxiliary agent powder is present in an amount ranging from 4 parts by weight to 9 parts by weight based on 100 parts by weight of the rubber granules.

According to the present disclosure, the type and amount of the vulcanization accelerator powder may be flexibly adjusted by those skilled in the art according to the performance requirement of the thermoplastic vulcanizates. An example of the vulcanization accelerator well-known or commonly used in vulcanization of rubber includes stannous chloride, but is not limited thereto. In certain embodiments, the vulcanization accelerator powder is a stannous chloride powder. In certain embodiments, the vulcanization accelerator powder is present in an amount ranging from 0.2 parts by weight to 2 parts by weight based on 100 parts by weight of the rubber granules.

According to the present disclosure, the type and amount of the vulcanizing agent powder may be flexibly adjusted by those skilled in the art according to the performance requirement of the thermoplastic vulcanizates. An example of the vulcanizing agent well-known or commonly used in vulcanization of rubber includes a phenolic resin powder, but is not limited thereto. In order to effectively control the speed of the dynamic vulcanization, the vulcanizing agent powder is present in an amount ranging from 0.5 parts by weight to 5 parts by weight based on 100 parts by weight of the rubber granules.

According to the present disclosure, the type and amount of the auxiliary agent powder may be flexibly adjusted by those skilled in the art according to the performance requirement of the thermoplastic vulcanizates. Examples of the auxiliary agent well-known or commonly used for processing rubber include an antioxidant agent and a processing auxiliary agent, but are not limited thereto. In certain embodiments, the auxiliary agent powder includes an antioxidant agent powder and a processing auxiliary agent powder. Examples of the antioxidant agent powder include a phosphite antioxidant powder and a hindered phenolic antioxidant powder, but are not limited thereto. An example of the processing auxiliary agent powder includes a polypropylene wax, but is not limited thereto. In certain embodiments, the auxiliary agent powder is present in an amount ranging from 2 parts by weight to 20 parts by weight based on 100 parts by weight of the rubber granules.

According to the present disclosure, in step (b), the type and specification of the extruder are not particularly limited, any extruder that is well-known or commonly used for processing rubber or plastic may be suitable, and the parameters of the extruder may be flexibly adjusted by those skilled in the art according to the performance requirement of the thermoplastic vulcanizates. In certain embodiments, the extruder is a twin-screw extruder. The extruder may be connected to a granulator or an injection molding machine downstream thereof, so that the thus obtained thermoplastic vulcanizates are further subjected to pelletization or injection molding. In certain embodiments, the thus obtained thermoplastic vulcanizates are further subjected to injection molding at a temperature not greater than 250° C.

According to the present disclosure, in step (c), the type and amount of the processing oil may be flexibly adjusted by those skilled in the art according to the performance requirement of the thermoplastic vulcanizates. An example of the processing oil well-known or commonly used in dynamic vulcanization includes white oil, but is not limited thereto. In certain embodiments, the processing oil is white oil.

According to the present disclosure, the processing oil may be selected to be introduced, in whole or divided into two portions, into the extruder based on the actual value of the total amount of the processing oil. In certain embodiments, the processing oil is introduced in whole (at once) into the extruder. In some embodiments, the processing oil, divided into a first portion and a second portion, is introduced into the extruder, and the first portion is present in an amount not greater than 28 wt % based on 100 wt % of the processing oil, while the amount of the second portion is the remaining amount of the processing oil. In the present disclosure, the terms “first” and “second” are used to clearly describe and distinguish the two portions which the processing oil is divided into, and there is no limitation on the sequence in which the two portions of the processing oil is introduced into the extruder, the position where the two portions of the processing oil is introduced into the extruder, or the sequence in which the two portions is mixed with the first mixture. For example, the first portion and the second portion of the processing oil may be simultaneously introduced into the extruder, the first portion and the second portion of the processing oil may be sequentially introduced into the extruder, the first portion and the second portion of the processing oil may be respectively introduced into different locations of the extruder, or the first portion and the second portion of the processing oil may be sequentially mixed with the first mixture after being introduced into the extruder.

The present disclosure will be described by way of the following examples. However, it should be understood that the following examples are intended solely for the purpose of illustration and should not be construed as limiting the present disclosure in practice.

Preparation of Thermoplastic Vulcanizates

Example 1

Preparation of thermoplastic vulcanizates involves use of a twin-screw extruder (Manufacturer: ICMA San Giorgio; Model no.: MCM/40 V2) having a screw with a length-to-diameter of 44. The twin-screw extruder includes eleven barrels used for feeding and reaction, and each of the barrels has a diameter of 40 mm. The barrels connected in series are in communication with one another, and cooperatively define a reaction space therein. The twin-screw extruder also includes a set of twin screws disposed to penetrate through the reaction space inside the barrels, and a die used for discharging reaction mixture from the reaction space. The barrels, positioned along a direction distal from the die to proximal to the die, are sequentially numbered as barrel no. 1 to barrel no. 11.

First, ethylene propylene diene monomer (EPDM) rubber granules (Manufacturer: Dow Inc.; Catalogue no.: NORDEL™ IP4770P), polypropylene pellets (a type of thermoplastic pellets, Manufacturer: Lee Chang Yung Chemical Corporation; Catalogue no.: Globalene® PT181), a phenolic resin powder (a type of vulcanizing agent powder, Manufacturer: SI Group; Catalogue no.: SP-1045), a stannous chloride dihydrate powder (a type of vulcanization accelerator powder, purity: greater than 98%, Manufacturer: TMG Chemicals), a zinc oxide powder (a type of cross-linking auxiliary agent powder, purity: greater than 99.5%; Manufacturer: Sun Beam Tech. Industrial Co., Ltd.), a zinc stearate powder (another type of cross-linking auxiliary agent powder, amount of zinc ranging from 9.2% to 11.2 based on a total amount of the zinc stearate powder, Manufacturer: Kwang Cheng Co., Ltd.), a calcined kaolin powder (a type of filler powder; Manufacturer: Imerys; Catalogue no.: Glomax™ LX), a phosphite antioxidant powder (a type of antioxidant agent powder; Manufacturer: BASF; Catalogue no.: Irgafos® 168), a hindered phenolic antioxidant powder (another type of antioxidant agent powder; Manufacturer: BASF; Catalogue no.: Irganox® 1076FD), and a polypropylene wax (a type of processing auxiliary agent powder, Manufacturer: Clariant, Catalogue no.: Licocene PP 6102 GR) were evenly mixed so as to obtain a first mixture, which was present in a solid form. A particle size ratio of the EPDM rubber granules to the polypropylene pellets is not greater than 3:1. The amounts of the ingredients mixed to obtain the first mixture are shown in Table 1 below.

Next, the first mixture was introduced into the barrel no. 1 of the extruder. Thereafter, a white oil (a type of processing oil, Manufacturer: *Formosa* Petrochemical Corporation; Catalogue no.: Group II Base Oil 500N) that was present in an amount of 39.8 wt % based on 100 wt % of the white oil and the first mixture, was divided into a first portion and a second portion to be introduced into the extruder. To be specific, the first portion of the white oil, which was present in an amount of 10.8 wt % based on 100 wt % of the white oil and the first mixture, was fed into the barrel no. 3 of the extruder, while the second portion of the white oil, which was present in an amount of 29.0 wt % based on 100 wt % of the white oil and the first mixture, was fed into the barrel no. 7 of the extruder. The first portion and the second portion of the white oil, after being fed into the extruder, were sequentially and evenly mixed with the first mixture, so as to obtain a second mixture.

Afterwards, the second mixture was subjected to dynamic vulcanization in the twin-screw extruder, so as to obtain the thermoplastic vulcanizates which includes vulcanized rubber present in the dispersed phase and thermoplastics present in the continuous phase. Completion of the dynamic vulcanization was determined by the appearance of the thermoplastic vulcanizates discharged from the die of the twin-screw extruder. If the thermoplastic vulcanizates appeared as a continuous strip, the dynamic vulcanization of the second mixture was determined to be completed, whereas if the thermoplastic vulcanizates appeared as a non-continuous strip (i.e., the thermoplastic vulcanizates broke when discharged from the die), the dynamic vulcanization of the second mixture was determined to be not yet completed.

During the dynamic vulcanization of the second mixture in the twin-screw extruder, the die had a temperature of 250° C., the twin screw had a rotating speed of 350 rpm and a back pressure of less than 90 bar, and the barrel no. 1 to barrel no. 11 had temperatures of 50° C., 150° C., 150° C., 150° C., 155° C., 160° C., 155° C., 155° C., 160° C., 170° C., and 175° C., respectively.

Example 2

The procedures and conditions for preparing the thermoplastic vulcanizates of Example 2 were similar to those of Example 1, except for the differences in the amounts of the ingredients used to obtain the first mixture and the amounts of the first portion and the second portion of the processing oil, as shown in Table 1 below.

Property Evaluation of the Thermoplastic Vulcanizates

1. Shore a Hardness

A respective one of the thermoplastic vulcanizates of Examples 1 and 2 were subjected to injection molding using an injection molding machine (Manufacturer: Fu Chun Shin Machinery Manufacture, Co., Ltd.; Model no.: FT-110) under the condition that the temperature of the injection molding machine was controlled to be not greater than 250° C., so as to obtain test samples 1 and 2 each having a thickness of 3 mm, followed by subjecting the test samples 1 and 2 to measurement of Shore A hardness, in accordance to the procedures set forth in the Standard Test Method for Rubber Property—Durometer Hardness of the ASTM D2240 (published in 2000) with a delay of 5 seconds. The results are shown in Table 2 below.

2. Tensile Strength at Break, Modulus at 100% Elongation, and Elongation at Break A respective one of the thermoplastic vulcanizates of Examples 1 and 2 were subjected to injection molding using an injection molding machine (Manufacturer: Fu Chun Shin Machinery Manufacture, Co., Ltd.; Model no.: FT-110) under the condition that the temperature of the injection molding machine was controlled to be not greater than 250° C., so as to obtain test samples 1 and 2 each having a thickness of 3 mm. Thereafter, the test samples 1 and 2 were subjected to measurement of tensile strength at break, modulus at 100% elongation, and elongation at break conducted at a temperature of 23° C. and a speed of 500 mm/minute using a tensile testing machine (Manufacturer: GOTECH Testing Machine Inc.; Model no.: AI-7000S), in accordance to the procedures set forth in the Standard Test Methods for Vulcanized Rubber and Thermoplastic Elastomers—Tension of the ASTM D412 (published in 2002). The results are shown in Table 2 below.

3. Specific Gravity

A respective one of the thermoplastic vulcanizates of Examples 1 and 2 were subjected to injection molding using an injection molding machine (Manufacturer: Fu Chun Shin Machinery Manufacture, Co., Ltd.; Model no.: FT-110) under the condition that the temperature of the injection molding machine was controlled to be not greater than 250° C., so as to obtain test samples 1 and 2 each having a thickness of 3 mm, followed by subjecting the test samples 1 and 2 to measurement of specific gravity, in accordance to the procedures set forth in the Standard Test Methods for Density and Specific Gravity (Relative Density) of Plastics by Displacement of the ASTM D792 (published in 2020). The results are shown in Table 2 below.

4. Melt Flow Index

A respective one of the thermoplastic vulcanizates of Examples 1 and 2 were subjected to injection molding using an injection molding machine (Manufacturer: Fu Chun Shin Machinery Manufacture, Co., Ltd.; Model no.: FT-110) under the condition that the temperature of the injection molding machine was controlled to be not greater than 250° C., so as to obtain test samples 1 and 2 each having a thickness of 3 mm, followed by subjecting the test samples 1 and 2 to measurement of melt flow index conducted at a temperature of 200° C. and a standard weight of 8.16 kg, in accordance to the procedures set forth in the Standard Test Method for Melt Flow Rates of Thermoplastics by Extrusion Plastometer of the ASTM D1238 (published in 2023). The results are shown in Table 2 below.

In industrial practice, the hardness of the thermoplastic vulcanizates is usually used as a basis to evaluate mechanical properties thereof (i.e., tensile strength at break, modulus at 100% elongation, and elongation at break), and the melt flow index of the thermoplastic vulcanizates is used for evaluating the fluidity thereof, which is used as a basis to determine further options for processing the thermoplastic vulcanizates, for example, subjecting the thermoplastic vulcanizates to granulation molding, injection molding or other types of molding. As shown in Table 2, based on the results of the evaluated property, the thermoplastic vulcanizates of Examples 1 and 2 met the requirements of downstream products.

In summary, by evenly mixing the rubber granules, the thermoplastic pellets, the filler powder, the cross-linking auxiliary agent powder, the vulcanization accelerator powder, the vulcanizing agent powder, and the auxiliary agent powder to obtain the first mixture that is introduced into the extruder, followed by introducing into the extruder, the processing oil that is present in an amount ranging from 130 parts by weight to 200 parts by weight based on 100 parts by weight of the rubber granules, the method for manufacturing thermoplastic vulcanizates of the present disclosure allows the processing oil that is only divided into two portions at most and the first mixture to be evenly mixed in the extruder, which not only simplifies the manufacturing process and lowers the production cost of the thermoplastic vulcanizates, but also confers desirable properties on the thus manufactured thermoplastic vulcanizates.

TABLE 1

| Ingredients | | | Barrel no. | Example 1 Amount (wt %) | Example 1 Amount (parts by weight) | Example 2 Amount (wt %) | Example 2 Amount (parts by weight) |
|---|---|---|---|---|---|---|---|
| First mixture | Rubber granules | EPDM rubber granules | 1 | 30.5 | 100 | 21.8 | 100 |
| | Thermoplastics pellets | Polypropylene pellets | 1 | 9.1 | 29.8 | 21.3 | 97.7 |
| | Filler powder | Calcined kaolin powder | 1 | 13.7 | 44.9 | 9.0 | 41.3 |
| | Cross-linking auxiliary agent powder | Zinc oxide powder | 1 | 1.4 | 4.6 | 1.6 | 7.3 |
| | | Zinc stearate powder | 1 | 0.5 | 1.6 | 0.3 | 1.4 |
| | Vulcanization accelerator powder | Stannous chloride powder | 1 | 0.5 | 1.6 | 0.3 | 1.4 |
| | Vulcanizing agent powder | Phenolic resin powder | 1 | 1.2 | 3.9 | 1.0 | 4.6 |
| | Auxiliary agent powder | | 1 | 3.3 | 10.8 | 2.7 | 12.4 |
| Processing oil | White oil | First portion | 3 | 10.8 | 35.4 | 9.7 | 44.5 |
| | | Second portion | 7 | 29.0 | 95.1 | 32.3 | 148.2 |
| Total amount of first mixture and processing oil | | | — | 100 | 327.9 | 100 | 458.7 |

Notes:
"—": not determined
In Example 1, the first portion was present in an amount of 27.1 wt % based on 100 wt % of the processing oil.
In Example 2, the first portion was present in an amount of 23.1 wt % based on 100 wt % of the processing oil.

TABLE 2

| Product | Evaluated property | Example 1 | Example 2 |
|---|---|---|---|
| Thermoplastic vulcanizates | Hardness (Shore A) | 57 | 78 |
| | Tensile strength at break (Psi) | 526 | 1049 |
| | Modulus at 100% elongation (Psi) | 289 | 402 |
| | Elongation at break (%) | 224 | 551 |
| | Specific gravity | 0.968 | 0.978 |
| | Melt flow index (g/10 min) | 15.6 | 20.4 |

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for manufacturing thermoplastic vulcanizates, comprising the steps of:

(a) subjecting rubber granules, thermoplastic pellets, a filler powder, a cross-linking auxiliary agent powder, a vulcanization accelerator powder, a vulcanizing agent powder, and an auxiliary agent powder to evenly mixing so as to obtain a first mixture;

(b) introducing the first mixture into an extruder;

(c) introducing, in whole or divided into two portions, a processing oil into the extruder to be evenly mixed with the first mixture so as to obtain a second mixture, the processing oil being present in an amount ranging from 130 parts by weight to 200 parts by weight based on 100 parts by weight of the rubber granules; and (d) subjecting the second mixture to dynamic vulcanization in the extruder so as to obtain the thermoplastic vulcanizates, wherein in step (c), the processing oil, divided into a first portion and a second portion, is introduced into the extruder, the first portion being present in an amount not greater than 28 wt % based on 100 wt % of the processing oil.

2. The method as claimed in claim 1, wherein a particle size ratio of the rubber granules to the thermoplastic pellets is not greater than 3:1.

3. The method as claimed in claim 1, wherein the rubber granules are ethylene propylene diene monomer (EPDM) rubber granules, the rubber granules being present in an amount ranging from 18.5 wt % to 35.7 wt % based on 100 wt % of the second mixture.

4. The method as claimed in claim 1, wherein the thermoplastic pellets are polypropylene pellets, the thermoplastic pellets being present in an amount of not lower than 15 parts by weight based on 100 parts by weight of the rubber granules.

5. The method as claimed in claim 1, wherein the vulcanizing agent powder is a phenolic resin powder, the vulcanizing agent powder being present in an amount ranging from 0.5 parts by weight to 5 parts by weight based on 100 parts by weight of the rubber granules.

6. The method as claimed in claim 1, wherein the vulcanization accelerator powder is a stannous chloride powder, the vulcanization accelerator powder being present in an amount ranging from 0.2 parts by weight to 2 parts by weight based on 100 parts by weight of the rubber granules.

7. The method as claimed in claim 1, wherein the cross-linking auxiliary agent powder includes a zinc oxide powder and a zinc stearate powder, the cross-linking auxiliary agent powder being present in an amount ranging from 4 parts by weight to 9 parts by weight based on 100 parts by weight of the rubber granules.

8. The method as claimed in claim 1, wherein the filler powder is a calcined kaolin powder, the filler powder being present in an amount ranging from 9.5 parts by weight to 50 parts by weight based on 100 parts by weight of the rubber granules.

9. The method as claimed in claim 1, wherein the auxiliary agent powder includes an antioxidant agent powder and a processing auxiliary agent powder, the auxiliary agent powder being present in an amount ranging from 2 parts by weight to 20 parts by weight based on 100 parts by weight of the rubber granules.

10. A method for manufacturing thermoplastic vulcanizates, comprising the steps of:

(a) subjecting rubber granules, thermoplastic pellets, a filler powder, a cross-linking auxiliary agent powder, a vulcanization accelerator powder, a vulcanizing agent powder, and an auxiliary agent powder to evenly mixing so as to obtain a first mixture;

(b) introducing the first mixture into an extruder;

(c) introducing, in whole or divided into two portions, a processing oil into the extruder to be evenly mixed with the first mixture so as to obtain a second mixture, the processing oil being present in an amount ranging from 130 parts by weight to 200 parts by weight based on 100 parts by weight of the rubber granules; and (d) subjecting the second mixture to dynamic vulcanization in the extruder so as to obtain the thermoplastic vulcanizates, wherein a particle size ratio of the rubber granules to the thermoplastic pellets is not greater than 3:1.

11. The method as claimed in claim 10, wherein in step (c), the processing oil, divided into a first portion and a second portion, is introduced into the extruder, the first portion being present in an amount not greater than 28 w % based on 100 wt % of the processing oil.

12. The method as claimed in claim 10, wherein the rubber granules are ethylene propylene diene monomer (EPDM) rubber granules, the rubber granules being present in an amount ranging from 18.5 wt % to 35.7 wt % based on 100 wt % of the second mixture.

13. The method as claimed in claim 10, wherein the thermoplastic pellets are polypropylene pellets, the thermoplastic pellets being present in an amount of not lower than 15 parts by weight based on 100 parts by weight of the rubber granules.

14. The method as claimed in claim 10, wherein the vulcanizing agent powder is a phenolic resin powder, the vulcanizing agent powder being present in an amount ranging from 0.5 parts by weight to 5 parts by weight based on 100 parts by weight of the rubber granules, and the vulcanization accelerator powder is a stannous chloride powder, the vulcanization accelerator powder being present in an amount ranging from 0.2 parts by weight to 2 parts by weight based on 100 parts by weight of the rubber granules.

15. The method as claimed in claim 10, wherein the cross-linking auxiliary agent powder includes a zinc oxide powder and a zinc stearate powder, the cross-linking auxiliary agent powder being present in an amount ranging from 4 parts by weight to 9 parts by weight based on 100 parts by weight of the rubber granules, the filler powder is a calcined kaolin powder, the filler powder being present in an amount ranging from 9.5 parts by weight to 50 parts by weight based on 100 parts by weight of the rubber granules, and the auxiliary agent powder includes an antioxidant agent powder and a processing auxiliary agent powder, the auxiliary agent powder being present in an amount ranging from 2 parts by weight to 20 parts by weight based on 100 parts by weight of the rubber granules.

16. A method for manufacturing thermoplastic vulcanizates, comprising the steps of:

(a) subjecting rubber granules, thermoplastic pellets, a filler powder, a cross-linking auxiliary agent powder, a vulcanization accelerator powder, a vulcanizing agent powder, and an auxiliary agent powder to evenly mixing so as to obtain a first mixture;

(b) introducing the first mixture into an extruder;

(c) introducing, in whole or divided into two portions, a processing oil into the extruder to be evenly mixed with the first mixture so as to obtain a second mixture, the processing oil being present in an amount ranging from 130 parts by weight to 200 parts by weight based on 100 parts by weight of the rubber granules; and (d) subjecting the second mixture to dynamic vulcanization in the extruder so as to obtain the thermoplastic vulcanizates, wherein the thermoplastic pellets are polypropylene pellets, the thermoplastic pellets being present in an amount of not lower than 15 parts by weight based on 100 parts by weight of the rubber granules.

17. The method as claimed in claim 16, wherein in step (c), the processing oil, divided into a first portion and a second portion, is introduced into the extruder, the first portion being present in an amount not greater than 28 wt % based on 100 wt % of the processing oil, and a particle size ratio of the rubber granules to the thermoplastic pellets is not greater than 3:1.

18. The method as claimed in claim 16, wherein the rubber granules are ethylene propylene diene monomer (EPDM) rubber granules, the rubber granules being present in an amount ranging from 18.5 wt % to 35.7 wt % based on 100 wt % of the second mixture.

19. The method as claimed in claim 16, wherein the vulcanization agent powder is a phenolic resin powder, the vulcanizing agent powder being present in an amount ranging from 0.5 parts by weight to 5 parts by weight based on 100 parts by weight of the rubber granules, the vulcanization accelerator powder is a stannous chloride powder, the vulcanization accelerator powder being present in an amount ranging from 0.2 parts by weight to 2 parts by weight based on 100 parts by weight of the rubber granules, and the cross-linking auxiliary agent powder includes a zinc oxide powder and a zinc stearate powder, the cross-linking auxiliary agent powder being present in an amount ranging from 4 parts by weight to 9 parts by weight based on 100 parts by weight of the rubber granules.

20. The method as claimed in claim 16, wherein the filler powder is a calcined kaolin powder, the filler powder being present in an amount ranging from 9.5 parts by weight to 50 parts by weight based on 100 parts by weight of the rubber granules, and the auxiliary agent powder includes an antioxidant agent powder and a processing auxiliary agent powder, the auxiliary agent powder being present in an amount ranging from 2 parts by weight to 20 parts by weight based on 100 parts by weight of the rubber granules.

* * * * *